G. W. CAVELL.
ROPE REEL.
APPLICATION FILED JUNE 25, 1908.

908,743.

Patented Jan. 5, 1909.

Witnesses—

Inventor.
George W. Cavell
by Brockett & Kwis
Attorneys.

UNITED STATES PATENT OFFICE.

GEORGE W. CAVELL, OF CLEVELAND, OHIO.

ROPE-REEL.

No. 908,743.　　Specification of Letters Patent.　　Patented Jan. 5, 1909.

Application filed June 25, 1908. Serial No. 440,236.

*To all whom it may concern:*

Be it known that I, GEORGE W. CAVELL, a citizen of the United States, residing at Cleveland, in the county of Cuyahoga and State of Ohio, have invented certain new and useful Improvements in Rope-Reels, of which the following is a specification.

This invention relates to line or rope reels or holders and is an improvement over a somewhat similar device forming the subject matter of my former patent No. 673,495, May 7th, 1901.

The object of the present invention is the provision of a line and rope holder of the same general type shown in my patent, but which will permit the line or rope to be wound and unwound more conveniently and more quickly.

In accordance with the present invention the frame which has substantially the same shape as the frame in the line holder shown in my patent is not formed integral with the handle but is swiveled thereon so that it can be turned rapidly with respect to the handle. The handle which has a swivel connection with the frame, in the present case passes loosely through loops or convolutions provided in one side of the frame and in a wire connecting the two opposite sides thereof. The wire of the handle is provided at the end with a curved or hooked shaped portion which not only prevents the frame from sliding off the handle, but as the device is preferably constructed there is a slight play of the frame upon the handle and the hook at the end is of sufficient length so that when it is desired to prevent the rotary movement of the same, all that is necessary is to shift the frame toward the hook until the end of the latter extends across or engages the connecting wire referred to when the frame can be held in fixed position by the pressure of the thumb upon one side of the frame, as will be brought out more clearly in the description taken in connection with the drawings.

My invention may be further briefly summarized as consisting in certain novel details of construction and combination and arrangement of parts which will be described in the specification and set forth in the appended claims.

Reference is had to the accompanying drawings in which—

Figure 1:
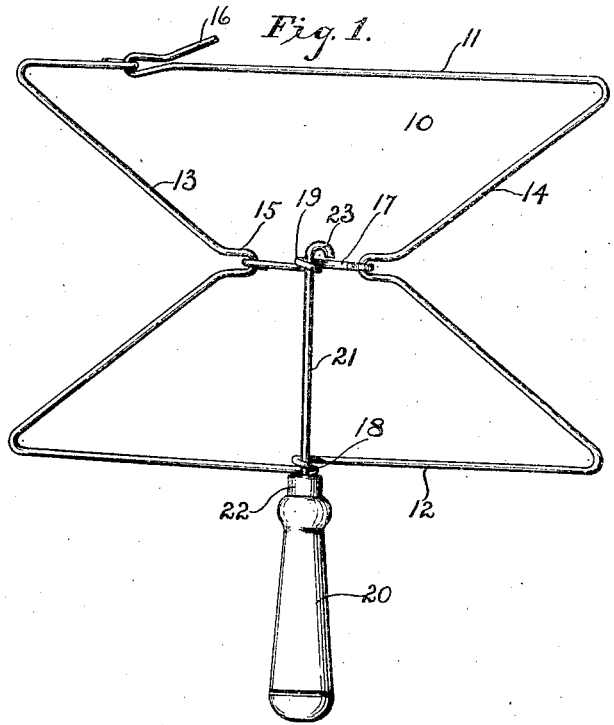
Figure 2:
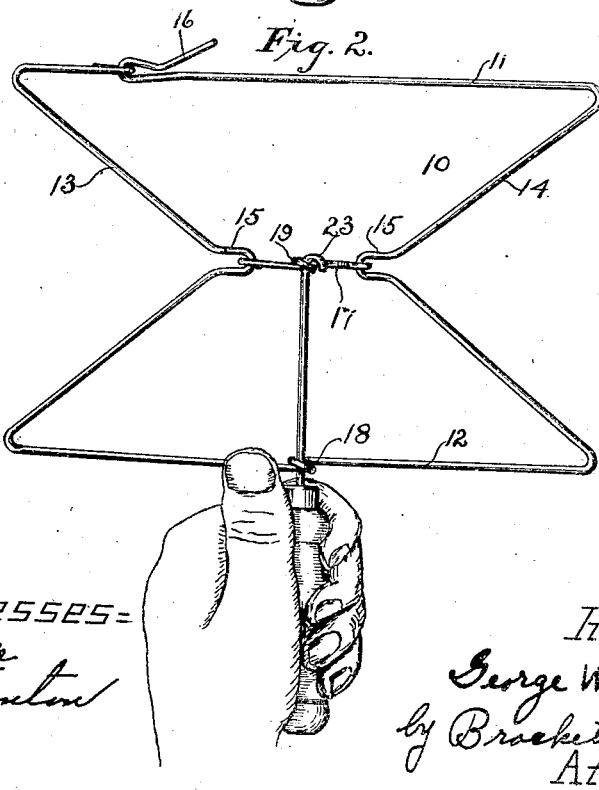

Figure 1 is an elevation of the reel, the frame being in the position so as to be capable of free rotation on the handle; and Fig. 2 is a similar view showing the manner in which the frame can be held by the pressure of the thumb against rotation.

Referring now to the figures of the drawing 10 represents the frame which is formed of wire and is provided with two parallel sides 11 and 12 which are substantially at right angles to the handle and with two sides 13 and 14 which are shaped so as to receive the line or rope and are for this purpose made V-shaped. At the apex of each of the V-shaped sides is a U-shaped portion 15 in either one of which the knotted end of the rope may be placed preparatory to winding. The free ends of the wire out of which the frame is formed are hooked together and one of the free ends 16 extends outward for a short distance at an acute angle to the corresponding side 11 forming therewith a V-shaped hook in which the free end of the line or rope may be caught after being wound on the reel so as to prevent its unwinding or becoming loose. Extending between the U-shaped portions 15 of the V-shaped sides 13 and 14 is a connecting wire 17, the ends of which are hooked over said U-shaped portions. At the center of the side portion 12 of the frame and at the center of the connecting wire 17 are loops 18 and 19 formed by bending or twisting the wire through one complete turn.

The handle which may be of any desired construction consists, in the present case, of a hand portion or grip 20 formed preferably of wood, and a wire or rod 21 which passes through the loops or convolutions 18 or 19 and is secured in the ends of the wooden portion, the end of which may be provided with a ferrule 22. The end of the wire portion 21 of the handle is curved or bent upon itself so as to form a hook 23, there being sufficient space between the end of the hook and the end of the wooden portion of the handle to permit the free rotation of the frame if desired. The frame may however be shifted outward a short distance until the end of the hook engages or is in the path of the connecting wire 17 as is shown in Fig. 2 and by placing the thumb upon the frame as shown the frame is held against rotation. Thus it will be seen that during the unwinding of the line or rope the frame may rotate freely upon the handle but when it is desired to wind the line or rope upon the frame the latter can be held against rotation and consequently both the winding and unwinding can be done conveniently and quickly.

I do not desire to be confined to the exact details shown, but aim in my claims to cover all modifications which do not involve a departure from the spirit and scope of my invention.

What I claim as new and desire to secure by Letters Patent is:

1. In a line or rope reel, a frame formed of wire and having two substantially parallel sides and two sides bent inward toward each other forming recesses in which the line or rope is adapted to be wound, a wire connecting said inwardly extending sides, said connecting wire and one of the parallel sides of the frame having loops formed therein by bending the wires, and a handle comprising a rod or wire extending through said loops and on which the frame is swiveled.

2. In a line or rope reel, a wire frame on which the line or rope is adapted to be wound, a handle comprising a wire or rod on which the frame is swiveled, said wire or rod having at its end a curved or hooked portion, said frame having a slight play longitudinally of the handle whereby it can be moved so as to engage said curved or hooked portion and can be held against rotation.

3. In a line or rope reel, a frame formed of wire and having two substantially parallel sides and two sides extending inwardly toward each other forming recesses in which the line or rope may be wound, a wire connecting said inwardly extending sides, said connecting wire and one of the parallel sides having loops formed by bending the wire, and a handle comprising a wire or rod extending freely through said loops, said wire or rod having at its end a curved or hooked portion, said frame having a limited play longitudinally of the handle whereby the frame can be moved outward so that the connecting wire is in the path of said curved or hooked portion, and the frame can be held against rotation by pressing the same against said curved or hooked portion.

In testimony whereof I affix my signature in presence of two witnesses.

GEORGE W. CAVELL.

Witnesses:
N. M. CALFEE,
RAE WEISS.